United States Patent

[11] 3,577,983

[72] Inventor Lee R. Baessler
 Torrance, Calif.
[21] Appl. No. 773,861
[22] Filed Nov. 6, 1968
[45] Patented May 11, 1971
[73] Assignee Humetrics Corporation
 Los Angeles, Calif.

[54] METHOD AND APPARATUS FOR AUTOMATICALLY SCREENING VARIABLY RECURRENT WAVEFORMS SUCH AS AN ELECTROCARDIAC SIGNAL
 34 Claims, 6 Drawing Figs.

[52] U.S. Cl. .................................................. 128/2.06
[51] Int. Cl. .................................................. A61b 5/04
[50] Field of Search.......................................... 128/2.06, 2.05

[56] References Cited
 UNITED STATES PATENTS
 3,123,768 3/1964 Burch et al. .................. 128/2.06X
 3,144,019 8/1964 Haber........................... 128/2.06
 3,267,934 8/1966 Thornton ..................... 128/2.06
 3,280,817 10/1966 Jorgensen..................... 198/2.05(5)
 3,352,300 11/1967 Rose............................. 128/2.06
 FOREIGN PATENTS
 1,264,680 3/1968 Germany..................... 128/2.06

Primary Examiner—William E. Kamm
Attorney—Burns, Doane, Swecker & Mathis

ABSTRACT: A method and apparatus including logic circuitry and interval detectors for selectively gating and evaluating subportions in individual cycles of a variably recurrent wave such as an electrocardiac signal. In distinction to attempting to subdivide such a variably recurrent signal in accordance with a running average rate, and in distinction to utilizing a measure of a preceding cycle time duration for setting desired gating periods to be applied in the immediately succeeding cycle for gating and measurement or evaluation, the present apparatus evaluates each subportion of the variably recurrent wave as a plurality of different subportions and displays one of the evaluations only after subsequent identification of the wave has been made relative to characteristically recurring points of inflection.

FIG. 2
GATING NETWORK

FIG.3 R & S WAVE DURATION ANALYSIS

FIG. 4
FIG. 6

FIG. 5

METHOD AND APPARATUS FOR AUTOMATICALLY SCREENING VARIABLY RECURRENT WAVEFORMS SUCH AS AN ELECTROCARDIAC SIGNAL

BACKGROUND OF THE INVENTION

This invention relates to the analysis of electrical waveforms and more particularly to the analysis of selected portions of variably recurrent electrical waveforms.

The analysis of electrical waveforms having recurrent voltage levels is presently employed in many environments, and has particular importance in such fields as physiological testing, seismic exploration and structural or machine vibrational analysis. For instance, in electrocardiography wherein recurrent electrical signals are derived from electrodes placed upon the body of a patient, signal gating techniques have been developed for analyzing selected portions of each signal recurrence sequence. A detailed disclosure of the selective gating of an electrocardiographic waveform may be found in the copending patent application, Ser. No. 500,122, entitled: "Method and Apparatus for Automatic Screening of Electrocardiac Signals," by Harvey F. Glassner, Clinton O. Jorgensen, and Lee R. Baessler, filed Oct. 21, 1965, and assigned to the assignee of the present invention.

Problems have heretofore been experienced in the use of signal gating techniques wherein the rate of signal recurrence is unstable, as variations from a normal rate of recurrence often produce undesirable results in signal gating accuracy. In electrocardiac testing, for example, the cardiac rate is known to be subject to wide variations from patient to patient, as well as with respect to a single patient under varying conditions. Hence, without means to vary the positions of the electrocardiac timing gates in response to variations in cardiac rate, erroneous classifications of the normalcy of a patient's heart may result.

Rate compensation apparatus has been heretofore developed in order to vary the durations and positions of timing gates in accordance with changes in the rate of recurrence of the electrical signal. Previous cardiac rate compensation circuitry has included capacitive averaging circuitry for producing an output voltage varying in magnitude in accordance with variations of the "running average" of the cardiac rate. Such systems usually attempt to locate a particular wave, for example the R wave, and to adjust the application of timing gates to the electrocardiac wave as a function of the output voltage of the capacitive averaging circuitry.

While "running average" circuitry and other circuitry heretofore developed for variable rate compensation of timing gates have been found to operate well when the recurrence rate is substantially constant or slowly varying, such circuitry has been found to be less than totally satisfactory with respect to extreme or sudden variations in the signal recurrence rate. The relatively slow response of previous rate compensation systems has thus prevented accurate tracking under such conditions as moderate cardiac arrhythmias which may be as high as 100 milliseconds. Further, previous rate compensation systems have sometimes caused erroneous indications to be presented as a result of sudden rate variances.

In a subsequent attempt to remedy the above deficiencies, a system was devised in which the time duration of one cycle of the signal was measured and used to set the gating periods applied to the immediately succeeding cycle of the same signal. In these systems the evaluation of the signal was generally inhibited when the duration of the cycle being evaluated varied beyond predetermined limits from the duration of the immediately antecedent cycle. Since the P wave in such systems was captured as a function of time only and since such systems were usually disabled in the event of an arrhythmia of 30 milliseconds, too few evaluation cycles and too many arrhythmia indications often resulted.

A detailed disclosure of a gating system of this type, i.e., beat by beat evaluation, may be found in U.S. Pat. No. 3,510,765 entitled: "Method and Apparatus for Gating Variably Recurrent Waveforms," by Lee R. Baessler, issued May 5, 1970 and assigned to the assignee of the present invention.

SUMMARY OF THE INVENTION

The present invention deals with variably recurrent electrical waveforms. Such waveforms comprise a recognizable sequence of voltage variations, or waveform pattern, which are repeated with variation in the period of cyclic recurrence. Such waveforms may be encountered in a sequence of signal levels supplied by binary-type generators, or from such signals read out from a recording medium in which the readout process imposes a variable recurrence rate or jitter thereupon. Primary examples of such signals are physiologically generated voltage patterns, such as the electrocardiac signal or an electrical version of the heart sound signal.

The analysis of these signals frequently requires electrical measurements of a particular phase sector of the voltage pattern. For instance, assuming, as is usually the case, that a reference phase position may be identified in each successive cycle, the time period between successive reference phase positions would represent the period of the phenomena, and in accordance with normal electrical practice, this is divided into the 360° reference system. It might be desired, for instance, to evaluate the signal by electrical measurements in the phase sector between 100° and 125°. With a constant repetition rate, a gating system using uniform timing signals is entirely practical. On the other hand, the present invention involves such analysis where the time duration of successive signal cycles may become quite erratic. While over a period of a multiplicity of cycles, there may well be a definite average frequency of recurrence, none or few of the individual cycles may conform to the average period of the group.

The present invention contemplates performing the desired analysis by evaluating a phase position of the signal as a number of reference phase positions and subsequently identifying the phase position by effectively determining reference phase position through detection of the major inflection points of the signal. The analysis of the phase position found to be correct is allowed to stand and the measurements performed are, after an appropriate time interval, indicated or otherwise employed. The utilization of the evaluation of those phase positions subsequently found to be incorrect is inhibited to avoid erroneous indications. In the system of the present invention, the process is cyclically repeated so that the analysis circuits are automatically reset at the end of each cycle and may be reset a number of times during a given cycle as waves are evaluated as one phase position and subsequently identified as some other phase position.

It is accordingly a primary object of the present invention to provide a novel method and apparatus for rapidly and accurately analyzing predetermined portions of a variably recurrent signal while automatically compensating the analysis for variations in the rate of recurrence.

Another object of the present invention is to provide a novel method and apparatus for identifying the phase positions of a variably recurrent waveform with respect to characteristically recurring points of inflection.

Still another object of the present invention is to provide a novel method and apparatus for identifying and evaluating the identical phase positions of a variably recurrent waveform.

Yet another object of the present invention is to provide a novel method and apparatus for evaluating a phase position of a variably recurrent signal as a plurality of phase positions prior to the identification thereof as determined by the relationship of the phase positions to characteristically recurring inflection points, as well as means for displaying only the evaluation subsequently determined to be correct.

A further object of the present invention is to provide a novel method and apparatus for evaluating the parameters of each phase position of a variably recurrent waveform and for inhibiting the display of the evaluation pending the subsequent identification of the phase position.

These and other objects and advantages of the present invention will be readily apparent to one skilled in the art to which the invention pertains from the claims and from a perusal of the following detailed description of a preferred embodiment when read in conjunction with the appended drawings.

BRIEF DESCRIPTION OF THE DRAWINGS

The method and apparatus of the present invention is particularly adapted to the evaluation of the variably recurrent waveforms of the electrocardiograph or ECG signal and the invention is hereinafter described for ease of understanding in that context. The invention and its many advantages may be further understood by reference to the following detailed description of a preferred embodiment as illustrated in the accompanying drawings, in which.

DETAILED DESCRIPTION OF A PREFERRED EMBODIMENT

Figure 1:
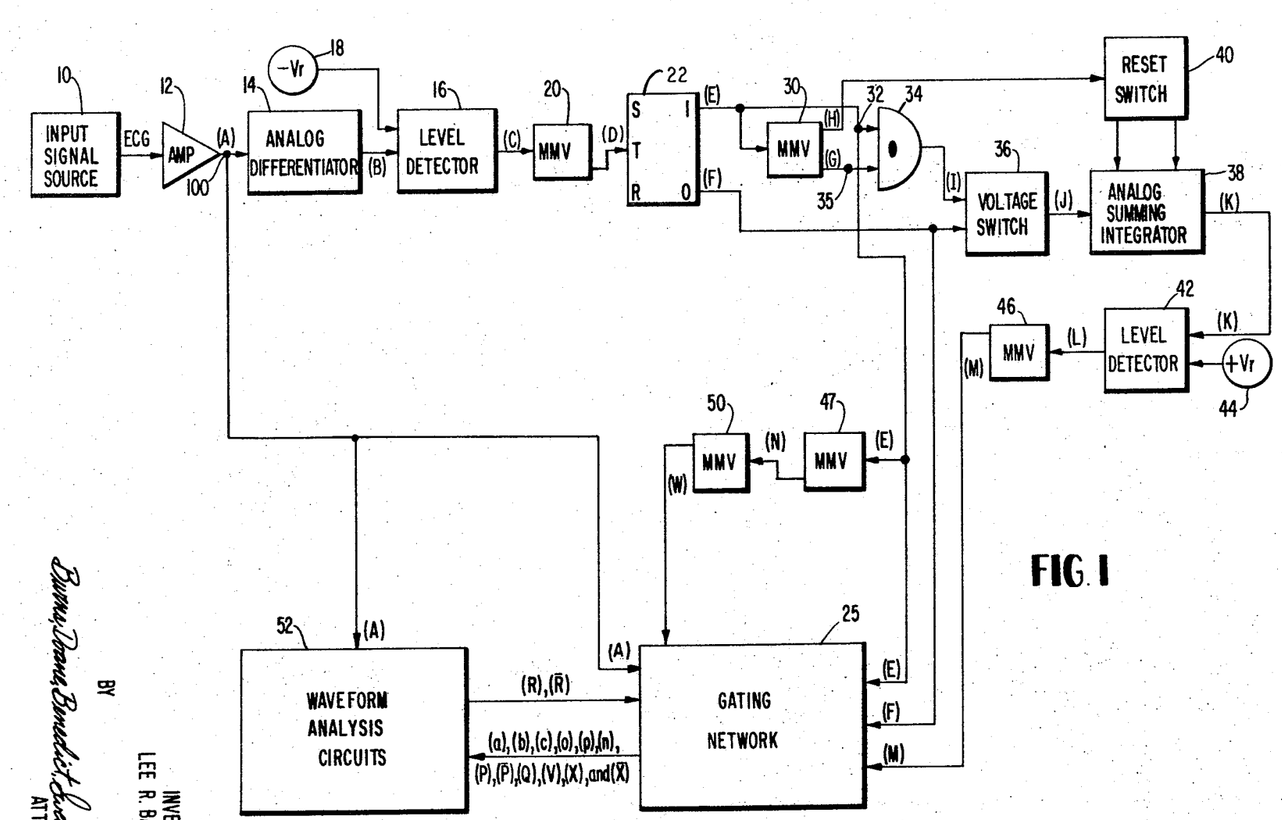
FIG. 1 is a schematic block diagram of the system of the present invention.

Referring to FIG. 1, the input waveform to the present invention is provided by an input source 10 which may, for example, comprise a plurality of conventional electrocardiac electrodes placed in a conventional manner on the body of the patient whose heart activity is to be examined. It will, of course, be understood that other input sources of physiological waveforms may be utilized in connection with the present system as well as other nonanalogous sources such as vibrational wave sources, seismic wave receivers, and the like.

Figure 5:
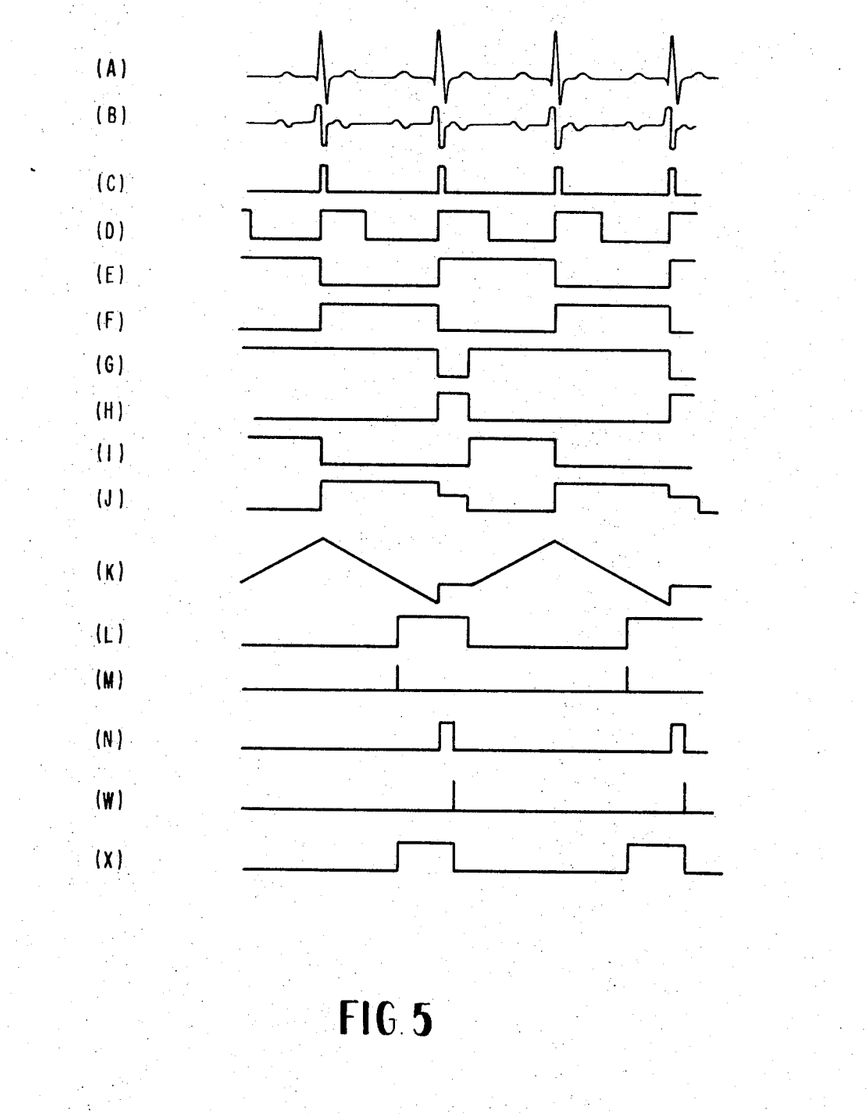
FIG. 5 is a diagram of waveforms of the system circuitry showing an assumed heart rate.

The input waveform may be amplified by a conventional amplifier 12 and the resulting waveform, as shown in FIG. 5 (A), is applied to the input terminal of an analog differentiator 14 to provide indications of the voltage peaks of the waveform (A) for accurate triggering purposes. The differentiated wave, shown in FIG. 5 (B), is applied to one input terminal of a level detector 16. A negative constant reference voltage from a source 18 is applied to a second input terminal of the level detector 16. The level detector 16 is conventional in its circuitry and operation and produces a high output signal, shown in FIG. 5 (C), only when the amplitude of the differentiated waveform (B) from the differentiator 14 is more negative than the reference voltage from the source 18.

The resulting voltage pulses, produced by the level detector 16, waveform (C), indicate the major inflection point of the ECG signal and may be used to toggle a conventional monostable or one-shot multivibrator 20 which produces, in response thereto, the positive going output pulses of the waveform illustrated in FIG. 5 (D). The output pulses of the waveform (D) have a predetermined duration and thus introduce a predetermined delay before a high signal level is again provided on the false output terminal thereof. These signals are applied to the set input terminals of a convention binary element or flip-flop 22. Complementary binary output signals (E) and (F) are produced by the flip-flop 22 in response to the leading edges of the output pulses of the waveform (D) as indicated in FIG. 5.

Figure 2:
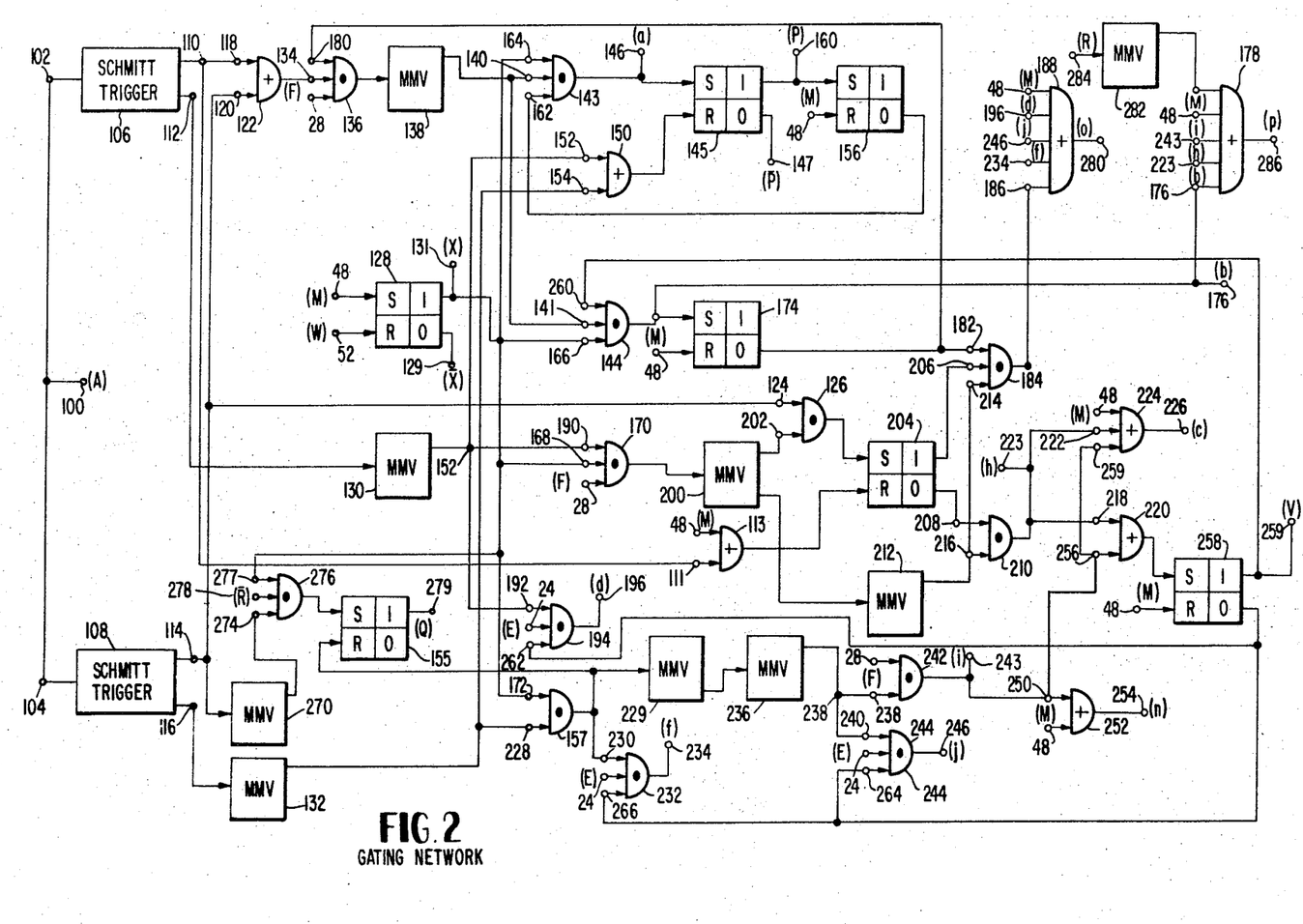
FIG. 2 is a schematic block diagram of the waveform identification logic gating network of FIG. 1.

The binary signal (E) is taken from the binary 1 output terminal of the flip-flop 22 and is directly applied to each of the terminals 24 of the AND gates 194, 232, and 244 of the gating network 25 illustrated in detail in FIG. 2.

The complementary binary signal (F) is taken from the binary 0 output terminal of the flip-flop 22 and is directly applied to the input terminals 28 of each of the AND gates 136, 170, and 242 of the gating network 25 of FIG. 2.

With continued reference to FIG. 1, the binary 1 output terminal of the flip-flop 22 is also connected to the input terminal of a monostable or one-shot multivibrator 30 and to one input terminal 32 of a two-input AND gate 34.

The false output terminal of the multivibrator 30 is connected to the other input terminal 35 of the AND gate 34. The waveform (I) from the output terminal of the AND gate 34 is applied to a voltage switch 36 together with the waveform (F) from the binary 0 output terminal of the flip-flop 22.

The voltage switch 36 provides an output signal illustrated as waveform (J) in FIG. 5. The output signal level is high when the higher voltage of the two-input signals is applied to a particular one of the two-input terminals, and is low when the higher voltage of the two-input signals is applied to the other of the two-input terminals. The voltage switch 36 provides no output voltage in the absence of the application of a positive signal to one of the input terminals. The specific circuitry of one embodiment of the voltage switch 36 was described in great detail in the Baessler patent supra herein incorporated by reference, and need not here be further described.

The output terminal of the voltage switch 36 is connected to the input terminal of the analog summing integrator 38, which may be of a conventional design wherein capacitive elements provide a continuous linear integration of the input signal in a manner well known in the art.

The second series of output pulses, waveform (H), from the true output terminal of the monostable multivibrator 30 is applied to the input terminal of a reset switch 40 which, in response to each of the pulses applied, electronically shorts out the integrating capacitance of the analog summing integrator 38 to reset the voltage thereof to zero. The specific circuitry of one embodiment of the reset switch 40 was also discussed in detail in the copending Baessler application, and will not herein be further described.

The integrated output signal, waveform (K), taken from the summing integrator 38, is applied to a level detector 42 which produces an output signal only when the amplitude of the integrated output signal (K) is more negative than the amplitude of a reference input voltage from a negative source 44. The signal, waveform (L), taken from the output terminal of the level detector 42, is applied to the input terminal of a monostable or one-shot multivibrator 46 to initiate a series of triggering pulses illustrated in the waveform of FIG. 5 (M). The trigger pulses (M) have a relatively small time duration and are applied to the gating network 25 illustrated in FIG. 2 where they are directly applied to the set input terminal S of the flip-flop 128 and the reset terminals R of the flip-flop 156, 174, and 258 of FIG. 2. The signal (M) is also directly applied to the input terminals 48 of the OR gates 113, 178, 188, 224, and 252 of FIG. 2.

With continued reference to FIG. 1, the signal (E) from the binary 1 output terminal of the flip-flop 22 is also used to trigger a monostable or one-shot multivibrator 47 which triggers, in turn, by way of the false output terminal thereof, a monostable or one-shot multivibrator 50.

The signal, waveform 5 (W), which appears on the true output terminal of the multivibrator 50 is applied to the reset input terminal 52 of the flip-flop 128 in the gating network 25 of FIG. 2.

The gating network 25 provides the 12 signals, $(a)$, $(b)$, $(c)$, $(o)$, $(n)$, $(p)$, $(P)$, $(\overline{P})$, $(Q)$, $(V)$, $(X)$, and $(\overline{X})$, which control the waveform analysis circuit 52 in the analysis of the signal (A) applied thereto from the amplifier 12.

For a reason to be subsequently explained, the waveform analysis circuit 52 provides signals (R) and $(\overline{R})$ which are fed back to the gating network 25.

With reference now to the gating network 25 of FIG. 2, the signal (A) is applied to an input terminal 100. Input terminal 100 is connected to the input terminals 102 and 104, respectively, of a pair of identical Schmitt trigger circuits 106 and 108. Both of the Schmitt trigger circuits 106 and 108 are conventional in circuitry and operation, and provide complementary binary output signals in response to the comparison of the amplitude of the signals applied to the input terminal and an internal reference voltage.

In this manner, Schmitt trigger 106 provides a high signal level on the true output terminal 110 and a low signal level on the false terminal 112 when the amplitude of the ECG waveform applied to the input terminal 102 exceeds a predetermined positive threshold. In a like manner, the Schmitt trigger 108 provides a high signal level on the true output terminal 114 and a complementary low signal level on the false output terminal 116 when the amplitude of the ECG waveform applied to the input terminal 104 becomes more negative than a given internal negative threshold.

The true output terminals 110 and 114 of the Schmitt trigger circuits 106 and 108 are directly connected respectively to the two-input terminals 118 and 120 of an OR gate 122. The true output terminal 114 of the Schmitt trigger circuit 108 is also directly connected to one input terminal 124 of a two-input AND gate 126, and to a monostable or one-shot multivibrator 270. The false output terminals 112 and 116 of the Schmitt trigger circuits 106 and 108 are connected respectively to the input terminals of monostable or one-shot multivibrators 130 and 132. The true output terminal 110 of the Schmitt trigger circuit 106 is also connected to one input terminal 111 of the two-input OR gate 113.

Both of the multivibrators 130 and 132, as well as all other monostable or one-shot multivibrators discussed in this application, are conventional both in their circuitry and in their operation, and provide a high output signal level on the true output terminal when triggered by the application of a high signal level on the input terminal thereof. The duration of the high signal level on the true output terminal of the multivibrators, i.e., the unstable condition thereof, is determined by the RC time constant thereof in a conventional manner well known in the art.

The AND gate 126 and all of those described in this application are also conventional in their circuitry and in their operation, and provide a high signal level on the output terminal only upon the coincidence of high signal levels on all of the input terminals thereto. The OR gate 122 and all of those described in this application are likewise conventional in their circuitry and operation, and will provide a high signal level on the terminal upon the application of a high signal level to any signal one, or both, of the input terminals thereto.

The output terminal of the OR gate 122 is directly connected to one input terminal 134 of the three-input AND gate 136. The output terminal of the AND gate 136 is directly connected to the input terminal of a monostable or one-shot multivibrator 138 whose true output terminal is directly connected to one input terminal 140 and 141, respectively, of a pair of three-input AND gates 143 and 144. The output terminal of the AND gate 143 is connected to the set input terminals of a binary element of flip-flop 145 and also to an output terminal 146 which is directly connected to the like-numbered input terminal of the PR interval analysis circuit hereinafter described in connection with FIG. 4. The signal (a) which appears on the terminal 146 is used in the analysis circuit of FIG. 4 to initiate the P—R interval analysis.

Connected to the reset terminal R of the flip-flop 145 is the output terminal of a two-input OR gate 150. One of the input terminals 152 of the OR gate 150 is directly connected to the like-numbered terminal at the output of the multivibrator 130. The other of the input terminals 154 of the OR gate 150 is connected to the like-numbered true output terminal of the multivibrator 132.

The binary 1 output terminal of the flip-flop 145 is connected to the set input terminal S of a binary element or flip-flop 156 and also connected to a terminal 160 of the P wave analysis circuit hereinafter to be described in connection with FIG. 4. The binary 0 output terminal of the flip-flop 145 is directly connected to the terminal 147 of the P wave analysis circuit of FIG. 4. The binary 0 output terminal of the flip-flop 156 is connected to the second input terminal 162 of the AND gate 143.

As earlier explained, the signals (M) and (W) are applied respectively to the set S and reset R input terminals of the flip-flop 128 from the circuit of FIG. 1. The binary 0 output terminal of the flip-flop 128 is directly connected to a terminal 129 in the R and S wave analysis circuit of FIG. 3.

The binary 1 output terminal of the flip-flop 128 is connected, as shown in FIG. 2, to the third input terminal 164 of the AND gate 143, to an input terminal 166 of the three-input AND gate 144, to an input terminal 168 of a three-input AND gate 170, to an input terminal 172 of the two-input AND gate 157 and to an input terminal 277 of a three-input AND gate 276. The binary 1 output terminal of the flip-flop 128 is also directly connected to a terminal 131 in the R and S wave analysis circuit of FIG. 3.

Figure 4:
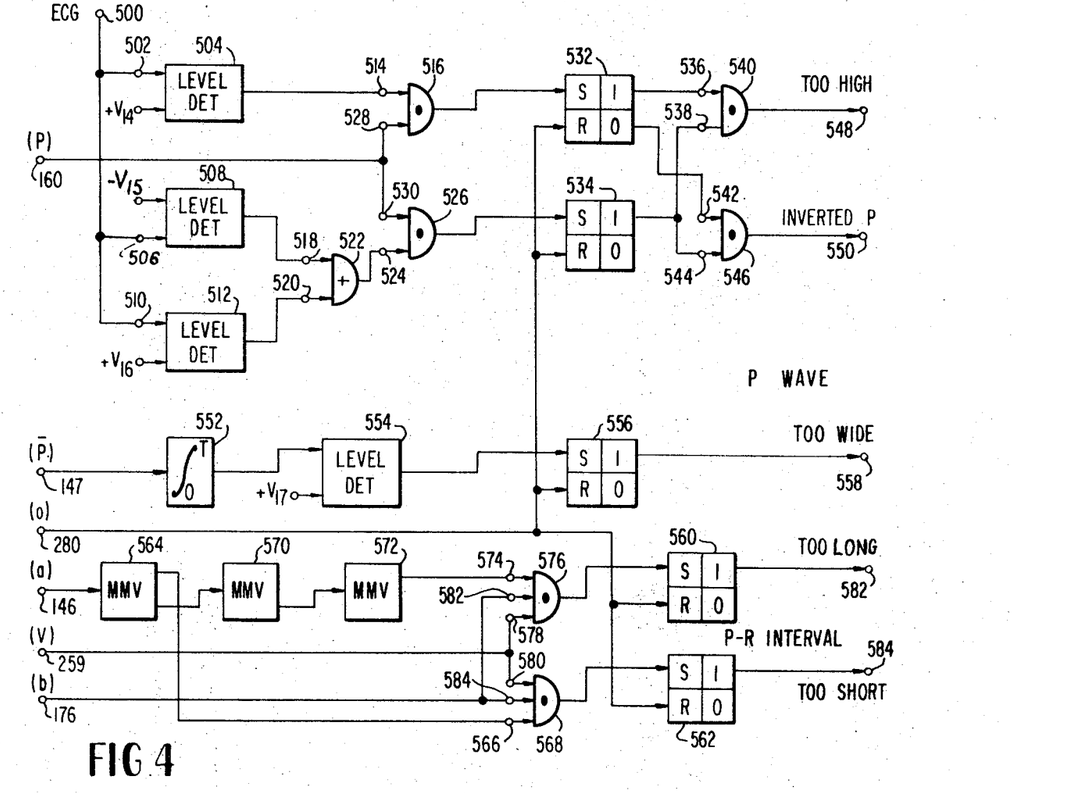
FIG. 4 is a schematic block diagram of the portion of the waveform analysis circuitry of FIG. 1 shown in block form in FIG. 3.

With continued reference to FIG. 2, the output terminal of the AND gate 144 is connected to the set input terminal of the binary element or flip-flop 174 and to a terminal 176 which corresponds to a like-numbered terminal of the five input OR gate 178 and the P—R interval analysis circuit of FIG. 4.

The binary 0 output terminal of the flip-flop 174 is connected to the input terminals 180 and 182, respectively, of the AND gates 136 and 184. The output terminal of the AND gate 184 is directly connected to the terminal 186 of the five input OR gate 188.

The output terminal of the multivibrator 130 is additionally connected to a terminal 190 of the three-input AND gate 170, and to a terminal 192 of the three-input AND gate 194. The output terminal of the AND gate 194 is directly connected, although not shown for the sake of clarity, to a terminal 196 corresponding to the like-numbered terminal of the OR gate 188.

The output terminal of the AND gate 170 is connected to the input terminal of a multivibrator 200. The true output terminal of the multivibrator 200 is connected to the other input terminal 202 of the AND gate 126. The output terminals of the AND gate 126 and the OR gate 113 are connected, respectively, to the set S and reset R input terminals of a binary element or flip-flop 204. The binary 1 output terminal of the flip-flop 204 is connected to the input terminal 206 of the AND gate 184. The binary 0 output terminal of the flip-flop 204 is connected to one input terminal 208 of a two-input AND gate 210.

The binary 0 output terminal of the multivibrator 200 is connected to the input terminal of a monostable or one-shot multivibrator 212. The true output terminal of the multivibrator 212 is connected to terminals 214 and 216, respectively, of AND gates 184 and 210.

The output terminal of the AND gate 210 is connected to one input terminal 218 of a two-input OR gate 220 and to an input terminal 222 of the three-input OR gate 224. The output terminal 226 of the OR gate 224 corresponds to the like-numbered terminal of the R and S wave analysis circuit 52 of FIG. 3. The output terminal of the AND gate 210 is also directly connected to the input terminal 223 of the OR gate 178.

Figure 3:
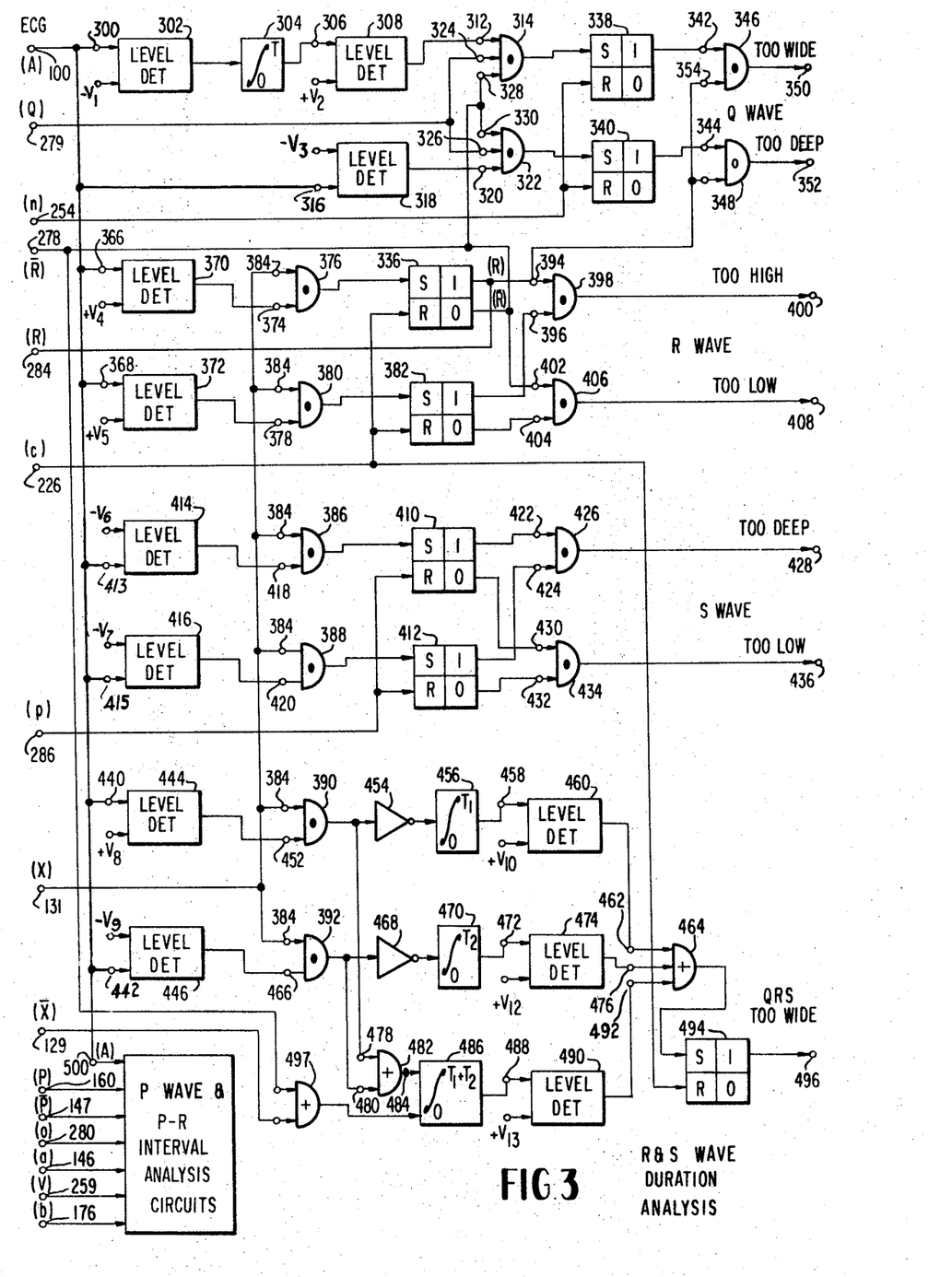
FIG. 3 is a schematic block diagram of a portion of the waveform analysis logic circuitry of FIG. 1.

The true output terminal of the multivibrator 270 is connected to an input terminal 274 of a three-input AND gate 276, the third input terminal 278 of which is connected to the like-numbered terminal of the R wave analysis circuit of FIG. 3.

The output terminal of the AND gate 276 is connected to the set input terminal S of the flip-flop 155. The binary 1 output terminal of the flip-flop 155 is directly connected to a terminal 279 in the Q wave analysis circuit of FIG. 3.

As earlier stated, the false output terminal 116 of the Schmitt trigger circuit 108 is connected to the input terminal of the multivibrator 132. The true output terminal of the multivibrator 132 is connected to the other input terminal 228 of the AND gate 157.

The output terminal of the AND gate 157 is connected to the reset input terminal R of the flip-flop 155, to the input terminal of a monostable or one-shot multivibrator 229, and to one input terminal 230 of the three-input AND gate 232. The output terminal 234 of the AND gate 232 is directly connected to the like-numbered input terminal of the OR gate 188. The output terminal of the AND gate 157 is also directly connected to the reset input terminal R of the flip-flop 155, as earlier described.

The false output terminal of the multivibrator 229 is connected to the input terminal of a monostable or one-shot multivibrator 236. The true output terminal of the multivibrator 236 is connected to the input terminals 238 and 240, respectively, of the two-input AND gate 242 and the three-input AND gate 244. The output terminal 246 of the AND gate 244 is directly connected to the like-numbered input terminal 246 of the OR gate 188.

The output terminal of the AND gate 242 is connected to one input terminal 250 of the two-input OR gate 252 whose output terminal 254 is directly connected to the like-numbered terminal of the Q wave analysis circuit of FIG. 3. The output terminal of the AND gate 242 is also directly connected to the input terminal 243 of the OR gate 178 as well as to the other input terminal 256 of the OR gate 220 and the input terminal 259 of the OR gate 224 of FIG. 2.

With continued reference to FIG. 2, the output terminal of the OR gate 220 is connected to the set input terminal S of the binary element or flip-flop 258. The binary 1 output terminal of the flip-flop 258 is connected to the third input terminal 260 of the AND gate 144 and to the terminal 259 of the P—R interval analysis circuit of FIG. 4. The binary 0 output terminal of the flip-flop 258 is connected to the input terminal 262 of the AND gate 194, the input terminal 264 of the AND gate 244, and to the input terminal 266 of the AND gate 232.

The output terminal 280 of the five input OR gate 188 is directly connected to the like-numbered input terminal of the P wave and P—R analysis circuits of FIG. 4.

The remaining unexplained input to the five input OR gate 178 is derived from the true output terminal of a monostable or one-shot multivibrator 282. The multivibrator 282 is triggered by the signal (R) derived from the R wave analysis circuit of FIG. 3 and applied to the terminal 284.

The output terminal 286 of the OR gate 178 is connected to the like-numbered terminal in the S wave analysis circuit of FIG. 3.

POSITIVE WAVE IDENTIFICATION

A more comprehensive understanding of the gating network 25 may be obtained by the examination of the response of the logic circuitry illustrated in FIG. 2 to the application of an ECG signal derived from the source 10 of FIG. 1.

With continued reference to FIG. 2, assume that the ECG signal includes a positive wave to be identified and analyzed as a positive P wave or an R wave. As earlier described in connection with the circuit of FIG. 1, a reset pulse, FIG. 5 (M), will be generated by the multivibrator 46 for a short time before the anticipated onset of the P wave.

With the occurrence of a reset pulse (M) and the application thereof to the input terminals 48, the flip-flops 156, 174, and 258 will be reset to provide a high signal level on 0 binary 0 output terminal and a low signal level on their binary 1 output terminal. The AND gates 143, 184, 232, and 244 will thereby receive enabling signals. The flip-flop 128 will by the same reset pulse (M) be set to provide a high signal level on the binary 1 output terminal which appears as the signal (X) on the input terminal 131 of FIG. 3 to enable the R wave, S wave, and QRS complex analysis circuits. At the same time, a low signal level ($\overline{X}$) is provided on the binary 0 output terminal to activate the R wave and S wave duration analysis circuits of FIG. 3.

The flip-flop 204 will also be reset by the application of the signal (M) to one of the input terminals 48 of the OR gate 113.

In addition, the signal (M) is applied to the input terminals 48 of the OR gates 224 and 252 to reset the flip-flops associated with the R wave analysis and Q wave analysis circuitry of FIG. 3 through the application of the signals (c) and (n), respectively, to the terminals 226 and 254. Signals (o) and (p) are produced by the five input OR gates 178 and 188 to reset the flip-flops associated with the P wave, S wave, and P—R interval analysis circuits of FIG. 3.

A high signal level will be provided at the output terminal 110 of the Schmitt trigger circuit 106 with the onset of the positive wave to be identified. This high signal level is passed through the OR gate 122 to the AND gate 136. Since the AND gate 136 is enabled by the high signal level (F) from the flip-flop 22 of FIG. 1 and by the resetting of the flip-flop 174 by the signal (M), the multivibrator 138 will be triggered to provide a 2 millisecond pulse to the terminals 140 and 141, respectively, of the AND gates 143 and 144. AND gate 144 is, however, disabled by the low signal level on the binary 1 output terminal of the flip-flop 258 thereby preventing the generation of a resetting signal (p) via the input terminal 176 of the OR gate 178 and the generation of the enabling signal (b) for the P—R interval analysis circuit of FIG. 3.

Since a high signal level has been reset on the binary 0 output terminal of the flip-flop 156, the AND gate 143 is enabled and a signal (a) of 2 milliseconds duration is provided on the input terminal 146 of FIG. 3 to initiate the operation of the P—R interval analysis circuit. This signal (a) also sets the flip-flop 145 to remove the signal ($\overline{P}$) from the terminal 147 and to provide a high signal level (P) respectively on the terminals 160 of the P wave analysis circuit of FIG. 3. The flip-flop 156 is also set thereby disabling the AND gate 143 and thus preventing the flip-flop 145 from reactivating the P wave analysis circuit of FIG. 3 by a subsequent positive going waveform during this particular ECG complex.

The R and S wave analysis circuits of FIGS. 3 and 4 are thus initially reset and evaluating the ECG signal. All of the elements of the circuit of FIG. 2 remain in their stable condition until the signal on the true output terminal 110 of the Schmitt trigger circuit 106 goes low indicating the termination of the positive wave. The high signal level which then appears on the false output terminal 112 of the Schmitt trigger circuit 106 triggers the multivibrator 130 to provide, by way of the OR gate 150, a high signal level on the reset input terminal of the flip-flop 145 removing the signal (P) and again providing the signal ($\overline{P}$) to the terminals 160 and 147 of the P wave analysis circuit of FIG. 4.

Since the AND gate 194 is disabled by the low signal level of the waveform (E) on the input terminal 24 thereof, the triggering of the multivibrator 130 will not produce the signal (d) which would reset the P wave and P—R interval analysis circuits of FIG. 3 by way of the five input OR gate 188.

The flip-flop 128 having been set by the signal (M), as earlier explained, and the waveform of FIG. 5 (F) from the circuit of FIG. 1 being at a high level, the multivibrator 130 triggers the multivibrator 200 by way of the enabled AND gate 170. Complementary pulses of approximately 20 milliseconds duration are thus provided by the multivibrator 200 at the end of which the AND gate 126 is again disabled and the multivibrator 212 is triggered to enable the AND gates 184 and 210.

The multivibrator 200 will set the flip-flop 204 by way of the AND gate 126 if the ECG signal goes negative during the time that the multivibrator 200 is in its unstable state, as indicated by a high signal level on the true output terminal 114 of the Schmitt trigger circuit 108. This condition can, however, arise only if the positive wave is an R wave or only an R wave is followed immediately by a negative wave, the S wave.

The setting of the flip-flop 204 will, therefore, identify the positive wave of the ECG signal as an R wave and the resetting of the P wave and P—R interval analysis circuits of FIG. 3 is initiated by way of the AND gate 184 and the five input OR gate 188.

The flip-flop 204 was reset through the OR gate 113 by the reset signal (M) or by the presence of the positive wave of the ECG signal. If the positive wave of the ECG signal was not an R wave, i.e., not followed by a negative S wave, the flip-flop 204 will remain in its reset condition. The high signal level on the true output terminal of the multivibrator 212 will therefore provide a signal (h) on the output terminal 223 of the AND gate 210 and thus terminal 286 of the OR gate 178 of FIG. 2 to reset the flip-flops associated with the S wave analysis circuit of FIG. 3. This high signal level provided by the AND gate 210 is also passed through the OR gate 224 to the terminal 226 to the circuit of FIG. 3 to reset the flip-flops associated with the R wave analysis circuit.

With continued reference to FIG. 2, the high signal level from the AND gate 210 is also passed through the OR gate 220 to set a high signal level on the binary 1 output terminal of the flip-flop 258. The AND gate 144 is thus enabled for the generation of the P—R interval analysis circuit enabling signals (b) and the enabling signal (V) on the input terminal 259 of the circuit of FIG. 4.

As apparent in the foregoing description, the gating network 25 is capable of distinguishing between the R wave and a positive P wave in identifying a positive wave of the ECG signal. Once the positive wave has been identified as a positive P wave, the duration of the P—R interval may be determined by the subsequent generation of the signal (b by the next wave, the Q, R, or S wave, in the ECG signal (A).

NEGATIVE WAVE IDENTIFICATION

Assume that a negative wave is applied to the input terminal 100 of the gating network of FIG. 2 after the network has been reset by an (M) pulse. The negative wave must be identified and evaluated either as a Q wave, an S wave, or a negative or inverted P wave.

The application of the negative wave to terminal 104 of the Schmitt trigger circuit 108 will provide a high signal level on the true output terminal 114 thereof. This high signal level will be passed through the OR gate 122 and, if the major inflection point as indicated by the signal (F) has not occurred, through the AND gate 136 to trigger the multivibrator 138. Inasmuch as the set condition of the flip-flop 128 has been assumed, the triggering of the multivibrator 138 will generate the (a) and (P) signals which are respectively passed to the terminals 146 and 160 of the P—R interval and P wave analysis circuit of FIG. 4.

If the AND gate 136 is not enabled, i.e., the major inflection point has occurred, the signals (a) and (P) will not be generated and the P—R interval and P wave analysis circuits of FIG. 4 will not be activated. The negative wave must still be identified as either a Q wave or an S wave.

As has been earlier explained in connection with a positive wave, the presence of a high signal level on the true terminal 114 of the Schmitt trigger circuit 108 within the 20 millisecond duration of the high signal level on the true output terminal 202 of the multivibrator 200 will find the AND gate 126 enabled and the flip-flop 204 will be set. This will result in the resetting of the P wave analysis circuit of FIG. 4 by way of the OR gate 188 and the signal (o) on the output terminal 280 thereof.

The true output terminal 114 of the Schmitt trigger circuit 108 is also connected to the multivibrator 270 which provides a high signal level on the true output terminal thereof. This high signal level is passed through the AND gate 276 to set the flip-flop 155 only if the R̄ wave has not been identified (R̄) and if the signal (X) has been generated. The Q wave analysis network of FIG. 3 is initiated by the setting of the flip-flop 155 and the resulting application of the signal (Q) to the input terminal 279 thereof. The negative wave which results in the activation of the Q wave analysis network must thus occur after the resetting signal (M), before the resetting signal (W), and before the R wave is identified.

On the termination of the negative wave, the multivibrator 132 will be triggered by the high signal level which will appear on the false output terminal 116 of the Schmitt trigger circuit 108. The high signal level on the true output terminal of the multivibrator 132 will be passed through the OR gate 150 to reset the flip-flop 145 and to thus remove the signal (P) and to provide the (P̄) signal to the terminal 147 of the P wave analysis network of FIG. 4.

Should the AND gate 157 be enabled by the high signal level of the (X) signal from the flip-flop 128, the triggering of the multivibrator 132 will successively trigger the multivibrators 229 and 236. If the signal (F) is high, i.e., the major inflection point has not occurred during the 2 millisecond output pulse of the multivibrator 236, the initiation of which is delayed 55 milliseconds by multivibrator 229, the wave will be a negative or inverted P wave. The AND gate 242 will be enabled and the signals (i) and (p) generated to reset the S wave analysis network of FIG. 3 by way of the OR gate 178 and the output terminal 286 thereof.

The flip-flop 258 will be set by way of the OR gate 220 to provide the enabling signal (V) to the terminal 259 of the P—R interval analysis circuit of FIG. 4. The signal (i) will also be passed through the OR gate 252 to the terminal 254 of FIG. 3 as the signal (n) thereby resetting the Q wave analysis circuitry.

If the level of the signal (F) is low at this time, i.e., after the occurrence of the major inflection point, the signal (i) will not be generated and the Q wave analysis circuitry of FIG. 3 will not be reset. On the contrary, the level of the signal (E) will be high and the AND gate 244, also enabled by the high signal level on the binary 0 output terminal of the flip-flop 258, will provide a signal (j) through the OR gate 188 to reset the P wave and P—R interval analysis circuitry of FIG. 4.

The P wave and P—R interval analysis circuitry will, of course, already have been reset by the signal from the AND gate 157 if the major inflection point has occurred at the time that the negative wave terminates. This early resetting of the P wave and P—R interval analysis circuits is accomplished through the AND gate 232 which is connected to provide a signal (f) to the OR gate 188 by way of the common terminal 234.

Q WAVE ANALYSIS

Referring now to the Q wave analysis network shown in FIG. 3, the amplified ECG signal (A) is applied by way of the input terminal 100 to the uppermost input terminal 300 of a level detector 302 to which a predetermined negative reference voltage $-V_1$, is applied. The level detector 302, like the other level detectors hereinafter described, is conventional in operation and provides a high signal level on the output terminal thereof when the signal on the uppermost of the two input terminals exceeds that of the lowermost or reference input terminal.

The output signal of the level detector 302 is applied to a conventional timing circuit 304 which may conveniently be of the integrating capacitor type. The output signal of the timing circuit 304 is thus a linearly increasing voltage ramp initiated by the level detector 302 and having an amplitude related to the time that the applied input signal exceeds the reference voltage thereof.

The output signal from the timing circuit 304 is directly connected to the uppermost input terminal 306 of a level detector 308 to which a predetermined positive reference voltage $V_2$ is applied. The output signal from the level detector 308 is applied to one input terminal 312 of a three-input AND gate 314.

The signal (A) is also applied to the lowermost input terminal 316 of a level detector 318 to which a negative reference voltage $-V_3$ is applied. The level of the reference voltage $-V_3$ is substantially below that of the reference voltage $-V_1$ applied to the level detector 302 for a reason subsequently to be explained. The output signal from the level detector 318 is applied to an input terminal 320 of a three-input AND gate 322.

The input terminals 324 and 326 respectively of the AND gates 314 and 322 are directly connected and are connected to the input terminal 279. The input terminal 279 is directly connected to the binary 1 output terminal of the flip-flop 155 of the gating network of FIG. 2 as earlier explained. The third input terminals 328 and 330 respectively of the AND gates 314 and 322 are also directly connected and are connected to the binary 0 output terminal 334 of the flip-flop 336 of the R wave analysis circuitry of FIG. 3.

With continued reference to FIG. 3, the output terminals of the AND gates 314 and 322 are connected to the set input terminals S of a pair of binary elements or flip-flops 338 and 340. The binary 1 output terminals of the flip-flops 338 and 340 are connected respectively to input terminals 342 and 344 of a pair of two-input AND gates 346 and 348. The output terminals 350 and 352 of the AND gates 346 and 348 may be connected respectively to conventional lamps or other suitable indicators (not shown) as may be desired.

The input terminal 254 is directly connected to the like-numbered output terminal of the OR gate 252 of the gating network of FIG. 2 and is connected to the reset terminals R of the flip-flops 338 and 340 of FIG. 3.

In operation, the level detector 302 will generate a negative pulse coincident with the detection of a negative going wave of the signal (A). The duration of this negative pulse will be equal to the length of time that the detected wave of the signal (A) is less than the negative threshold or reference voltage $-V_1$. The duration of the negative output signal from the level detector 302 is represented by the amplitude of the lineally increasing positive ramp voltage output signal from the timing circuit 304.

Should the amplitude of the ramp voltage exceed the level of the reference voltage $+V_2$ of the level detector 308, a positive pulse will be applied to the terminal 312 of the AND gate 314. If at this time the R̄ wave has not been identified, the signal (R̄) will be present on the input terminal 328. If in addition a Q wave has been identified by the presence of the signal (Q) from the terminal 279 of the flip-flop 155 of FIG. 2, the AND gate 314 will set the flip-flop 338 to provide an enabling signal on the terminal 342 of the AND gate 346. When the R wave is subsequently identified and the signal (R) from the binary 1 output terminal of the flip-flop 336 is applied to the input terminal 354 of the AND gate 346, a high signal level will be provided on the output terminal 350 indicating that the duration of the Q wave as detected by the level detector 308 is too long, i.e., the Q wave is excessively wide.

Should the voltage of the negative wave also fall below that of the reference voltage $-V_3$ of the level detector 318, a positive pulse will also be applied to the terminal 320 of the enabled AND gate 322 and will pass therethrough to set the flip-flop 340. An enabling signal will thus be provided to the AND gate 348. When the flip-flop 336 of the R wave analysis network is subsequently set, a high signal level will be provided on the output terminal 352 indicating that the Q wave was "too deep."

R WAVE ANALYSIS

Referring now to the R wave analysis circuitry of FIG. 3, the signal (A) is applied to the uppermost input terminals 366 and 368 respectively of level detectors 370 and 372 to which positive reference voltage $+V_4$ and $+V_5$ are applied. The output signal from the level detector 370 is applied to one input terminal 374 of a two-input AND gate 376 the output terminal of which is in turn directly connected to the set input terminal S of the binary element or a flip-flop 336. The output signal from the level detector 372 is applied to an input terminal 378 of a two-input AND gate 380 the output terminal of which is in turn connected to the set input terminal S of a binary element or flip-flop 382.

The input terminal 131 is connected to the binary 1 output terminal of the flip-flop 128 of the gating network of FIG. 2 to receive the signal (X) and to the directly connected input terminals 384 of the AND gates 376 and 380. The terminals 384 are also connected to the like numbered terminals of the AND gates 386, 388, of the S wave analysis circuit and to the AND gates 390 and 392 of the R wave and S wave duration analysis circuit.

The binary 1 output terminals of the flip-flops 336 and 382 are connected respectively to the input terminals 394 and 396 of a two-input AND gate 398. The output terminal 400 of the AND gate 398 may be connected to a suitable indicator (not shown). The binary 0 output terminals of the flip-flops 336 and 382 are connected respectively to the input terminals 402 and 404 of a two-input AND gate 406. The output terminal 408 of the AND gate 406 may be connected to a suitable indicator (not shown).

In operation, if the wave of the signal (A) exceeds that of the positive reference voltage $+V_4$ applied to the level detector 370 during the period between the time that the system is reset by the (M) pulse and the generation of the signal (W), i.e., the presence of the signal (X) on the input terminal 131, the AND gate 376 will set the flip-flop 336 to provide the signal (R) to the output terminal 284 and to the AND gates 346 and 348 of the Q wave analysis circuit described supra. The signal (R), as earlier explained, is applied to the like-numbered terminal at the input of multivibrator 282 of FIG. 2 to cause a generation of the signal (p) by the OR gate 178. The generation of the signal (p) effects the resetting of the flip-flops 410 and 412 of the S wave analysis circuitry by way of the input terminal 286.

With continued reference to FIG. 3, if the level of the signal (A) also exceeds the positive reference voltage $+V_5$ of the level detector 372, the flip-flop 382 will also be set by way of the AND gate 380. Thus the setting of both of the flip-flops 336 and 382 will provide a high signal level on the output terminal 400 indicating that the R wave has occurred and that it is "too high." Should the reference voltages of neither of the level detectors 370 or 372 be exceeded by the amplitude of the R wave, neither of the flip-flops 336 or 382 will be set and the AND gate 406 will provide a high signal level on the output terminal 408 indicating that the amplitude of the R wave is "too low." The reference voltages $+V_4$ and $+V_5$ are, of course, chosen to represent respectively the acceptable low and high amplitudes of the R wave.

S WAVE ANALYSIS

Referring now to the S wave analysis circuit of FIG 3, the signal (A) is applied respectively to the input terminals 413 and 415 of the level detectors 414 and 416 to which negative voltage references $-V_6$ and $-V_7$ are also applied. The output signal from the level detector 414 is applied to the input terminal 418 of a two-input AND gate 386. The output terminal of the AND gate 386 is directly connected to the set input terminal S of a binary element or flip-flop 410. The output signal from the level detector 416 is applied to the input terminal 420 of a two-input AND gate 388. The output terminal of the AND gate 388 is directly connected to the set input terminal S of a binary element or flip-flop 412.

The input terminal 286 is as has been earlier explained, directly connected to the reset terminals R of the flip-flops 410 and 412. The binary 1 output terminals of both of the flip-flops 410 and 412 are connected respectively to the input terminals 422 and 424 of a two-input AND gate 426 whose output terminal 428 may be connected to a suitable indicator (not shown). The binary 0 output terminals of the flip-flops 410 and 412 are similarly connected to the input terminals 430 and 432 of a two-input AND gate 434 whose output terminal 436 may be also connected to a suitable indicator (not shown).

In operation, when the level detector 414 indicates that the signal (A) has fallen below the negative threshold of the reference voltage $-V_6$ during the interval that the signal (X) is provided on the input terminal 131, the AND gate 386 will set the flip-flop 410. Should the amplitude of the signal (A) also fall below the reference voltage $-V_7$ of the level detector 416, the flipgflop 412 will also be set. A high level signal on the output terminal 428 indicating that the S wave was "too deep" will in this case be provided. If neither of the flip-flops 410 and 412 are set, the AND gate 434 will be enabled and will provide a high signal level on the output terminal 436 indicating that the S wave was "too low."

As in the case of the R wave analysis circuits, the reference voltages $-V_6$ and $-V_7$ are chosen to equal respectively the acceptable low and excessive negative amplitudes of the S wave.

R WAVE AND S WAVE DURATION ANALYSIS

With continued reference to FIG. 3, the signal (A) is applied to the uppermost input terminals 440 and 442 respectively of a pair of level detectors 444 and 446 which are supplied respectively with positive and negative reference voltages $+V_8$ and $-V_9$. The output signal from the level detector 444 is applied to the input terminal 452 of the AND gate 390. The output signal from the AND gate 390 is applied through an inverter 454 to a timing circuit 456. The output signal from the timing circuit 456 is applied to the uppermost input terminal 458 of a level detector 460 to which a positive reference voltage $+V_{10}$ is also applied. The output signal from the level detector 460 is applied to an input terminal 462 of a three-input OR gate 464.

The output signal from the level detector 446 is applied to the input terminal 466 of the AND gate 392. The output signal of the AND gate 392 is applied through an inverter 468 to a timing circuit 470. The output signal of the timing circuit 470 is applied to the uppermost input terminal 472 of a level detector 474 to which a positive reference voltage $+V_{12}$ is also applied. The output signal of the level detector 474 is connected to the input terminal 476 of the OR gate 464.

The output signals from both the AND gate 390 and the AND gate 392 are also applied respectively to the input terminals 478 and 480 of a two-input OR gate 482 whose output terminal is directly connected to the uppermost input terminal 484 of a summing integrator or sequential period timing circuit 486. The output signal from the timing circuit 486 is applied to the uppermost input terminal 488 of a level detector 490 to which a positive reference voltage $+V_{13}$ is also applied. The output signal from the level detector 490 is applied to the third input terminal 492 of the OR gate 464.

The output terminal of the OR gate 464 is connected to the set input terminal S of a binary element of flip-flop 494. The input terminal 226 is, as stated earlier, directly connected to the reset input terminal R of the flip-flop 494 and the binary 1 output terminal of the flip-flop 494 may be connected to a suitable indicator (not shown).

In operation and assuming an R wave which exceeds in amplitude the reference voltage $+V_8$, the level detector 444 will provide a signal to the timing circuit 456 during the period in which the level of the signal (X) is high. Should the amplitude of the output signal from the timing circuit 456 exceed the positive reference voltage $+V_{10}$, the level detector 560 will provide a signal via the OR gate 464 to set the flip-flop 494. A high signal level will thus be provided on the output terminal 496 indicating that the QRS complex is "too wide."

Similarly, should the amplitude of the signal (A) fall below the negative reference voltage $-V_9$ of the level detector 446, a signal will be applied to the timing circuit 470 for the duration thereof. Should the output signal of the timing circuit 470 exceed the reference voltage $+V_{12}$ of the level detector 474, a signal will be applied through the OR gate 464 to set the flip-flop 492 again indicating that the QRS complex is "too wide." Excessively wide positive or negative waves will thus provide the "too wide" output signal on the output terminal 496.

The output signals from both of the AND gates 390 and 392 are applied to the timing circuit 486 through the OR gate 482. Whereas the timing circuits 456 and 470 respectively provided a voltage responsive to the duration of the R and S waves, the voltage level of the timing circuit 486 indicates the combined width of the R and S waves, i.e., the S wave responsive ramp is initiated at the voltage level attained and held in response to the R wave. Should the combined R wave and S wave voltages exceed the reference voltage $+V_{13}$, the level detector 490 will provide a signal through the OR gate 464 to set the flip-flop 494. A QRS "too wide" indication may thus be obtained from an excessively wide S wave, and excessively wide R wave or from the combination of the widths of the R and S waves.

To prevent the continuous holding of the preceding voltage level, the timing circuit 486 is reset for the duration of the signal ($\overline{X}$) from the input terminal 129 and also for the duration of the signal ($\overline{R}$) from the flip-flop 336 of the R wave analysis network. Either of the signals ($\overline{X}$) and ($\overline{R}$) may be applied to the timing circuit 486 by way of the two-input OR gate 497.

P WAVE ANALYSIS

With reference now to FIG. 4 where the P wave analysis circuitry indicated in block form in FIG. 3 is shown in greater detail, the signal (A) from the terminal 500 of FIG. 3 is applied to the like-numbered terminal of the P wave analysis circuitry. Specifically, the signal (A) is applied to the uppermost input terminal 502 of a level detector 504 to which a positive reference voltage $+V_{14}$ is applied, to the input terminal 506 of a level detector 508 to which a negative reference voltage $-V_{15}$ is applied, and to the uppermost input terminal 510 of a level detector 512 to which a positive reference voltage $+V_{16}$ is applied.

The output signal from the level detector 504 is applied to one input terminal 514 of a two-input AND gate 516 the output terminal of which is connected to the set input terminal S of a binary element or flip-flop 532. The output signals from the level detectors 508 and 512 are applied respectively to the input terminals 518 and 520 of a two-input OR gate 522, whose output terminal is connected to an input terminal 524 of a two-input AND gate 526. The input terminal 160, the binary 1 output terminal of the flip-flop 145 of the gating network FIG. 2, is connected to the input terminals 528 and 530 respectively of the AND gates 516 and 526.

The output terminal of the AND gate 526 is connected to the set input terminal S of a binary element or flip-flop 534. The binary 1 output terminals of the flip-flops 532 and 534 are connected respectively to the input terminals 536 and 538 of a two-input AND gate 540. The binary 0 output terminal of the flip-flop 532 and the binary 1 output terminal of the flip-flop 534 are connected respectively to the input terminals 542 and 544 of a two-input AND gate 546. The output terminals 548 and 550 of the AND gates 540 and 546 may be connected to suitable indicators (not shown).

In operation, a positive wave of the signal (A) having an amplitude exceeding that of the reference voltage $+V_{14}$ will cause the level detector 504 to provide an enabling signal for the AND gate 516. If this AND gate is additionally enabled by the P wave indicating signal (P) from the terminal 160 of the flip-flop 145 of FIG. 2, the flip-flop 532 will be set. Should the voltage reference of the level detector 512 also be exceeded by the amplitude of the positive wave, the flip-flop 534 will also be set via the OR gate 522 and the AND gate 526. The setting of both of the flip-flops 532 and 534 will provide a high signal level on the output terminal 548 indicating that the amplitude of the P wave is excessively high.

If the P wave is inverted, the positive voltage reference $+V_{14}$ of the level detector 504 will not be exceeded and the flip-flop 532 will not be set. The negative voltage reference $-V_{15}$ of the level detector 508 will, however, be exceeded and the output signal therefrom passed through the OR gate 522 and the AND gate 526 to set the flip-flop 534. The AND gate 546 will, upon receiving a high signal level from the binary 0 output terminal of the flip-flop 532 and also a high signal level from the binary 1 output terminal of the flip-flop 534, provide a high signal level on the output terminal 550, indicating that the P wave is inverted.

The evaluation of the width of the P̄ wave, be it either positive or negative, is initiated by the removal of the signal (P) from the input terminal 147, i.e., from the binary 0 output terminal of the flip-flop 145 of FIG. 2. Removal of the signal (P̄) is seen as a negative pulse by the timing network 552 which generates a positive going ramp voltage. Should the amplitude of this ramp voltage exceed the level of the positive reference potential $\pm V_{17}$ applied to the level detector 552, the level detector 552 will set the flip-flop 556 and thus provide a high signal level on the binary 1 output terminal 558 thereof. A P wave of excessive width will thus, irrespective of its polarity, result in the accumulation of a voltage in the timing circuit 552 exceeding the reference voltage $+V_{17}$ of the level detector 554 and set the flip-flop 556 to indicating that the P wave is "too wide."

As earlier explained, the input terminal 280 is connected to the reset terminals R of the binary elements or flip-flops 532, 534, and 556 of the P wave analysis network to prevent the evaluation of some other wave as a P wave. The input terminal 280 is connected as well to the flip-flops 560 and 562 associated with the P—R interval analysis network hereafter to be described.

P-R INTERVAL ANALYSIS

With continued reference to FIG. 4, the signal (a) on the output terminal 146 of the AND gate 143 of FIG. 2 is applied to a monostable or one-shot multivibrator 564 having an output pulse of 100 milliseconds duration. The true output terminal of the multivibrator 564 is directly connected to an input terminal 566 of a three-input AND gate 568.

A positive going signal on the false output terminal of the multivibrator 564 at the termination of the unstable period thereof is used to trigger a monostable or one-shot multivibrator 570 having an output pulse of 120 milliseconds duration. A positive going signal on the false output terminal of the multivibrator 570 is applied to the input terminal of a monostable or one-shot multivibrator 572 also having an output pulse of 100 milliseconds duration. The true output terminal of the multivibrator 572 is connected to an input terminal 574 of a three-input AND gate 576.

The signal (V) as taken from the binary 1 output terminal 259 of the flip-flop 258 of FIG. 2 is applied to the input terminals 578 and 580 respectively of the AND gates 576 and 568. As was earlier explained, the signal (V) indicates that a P wave has occurred and is thus necessary for the evaluation of the P—R interval.

The input terminal 176, the output terminal of the AND gate 144 of FIG. 2, is connected to the input terminals 582 and 584 respectively of the AND gates 576 and 568. The (b) signal from the gating network of FIG. 2 indicates that the P—R interval should read.

The output terminals of the AND gates 576 and 568 are connected respectively to the set input terminals S of the flip-flops 560 and 562. The binary 1 output terminal of the flip-flop 560 is connected to an output terminal 582 and the binary 1 output terminal of the flip-flop 562 is directly connected to an output terminal 584. Suitable indicator lamps may, of course, be connected to the output terminals 582 and 584 as desired.

In operation, the generation of the signal (a) by the AND gate 143 in the gating network of FIG. 2 occurs when a positive or negative wave of the signal (A) coincides with the signal (X) from the flip-flop 128 at a time when a P wave has not been identified by the signal from the flip-flop 156. The signal (a) is used to successively trigger the multivibrators 564, 570, and 572 to collectively introduce a delay of about 120 milliseconds and to thereafter produce, from the multivibrator 572, a pulse of about 100 milliseconds duration. Should the signals (b) and (V) occur during this period, the AND gate 576 will be enabled and the flip-flop 560 set to indicate that the P—R interval is "too long."

If the signals (b) and (V) occur during the 100 millisecond duration of the pulse on the true output terminal of the multivibrator 564, the AND gate 568 will be enabled and the flip-flop 562 set to indicate that the P—R interval is "too short."

The nomenclature "P—R interval" is herein used in a manner common in the art to describe, not the time between the termination of the P wave and the initiation of the R wave, but the time between the initiation of the P wave and the initiation of the first wave of the QRS complex which thereafter appears. Thus an interval which is in fact a P—Q or a P—S interval is conventionally referred to by physicians as the P—R interval and such nomenclature has been adopted for the purpose of this application.

ANALYSIS DISPLAY INHIBITION

Because of the problems associated in the practical application of the subject invention in the testing of individuals in the vicinity, of a source of 60 $H_z$ power, and the difficulty in avoiding the vicinity, the present invention includes means for the detection of the presence of a 60 $H_z$ signal and for disabling of the analysis indicators in response thereto. An exemplary circuit for the purpose is disclosed in FIG. 6.

Figure 6:
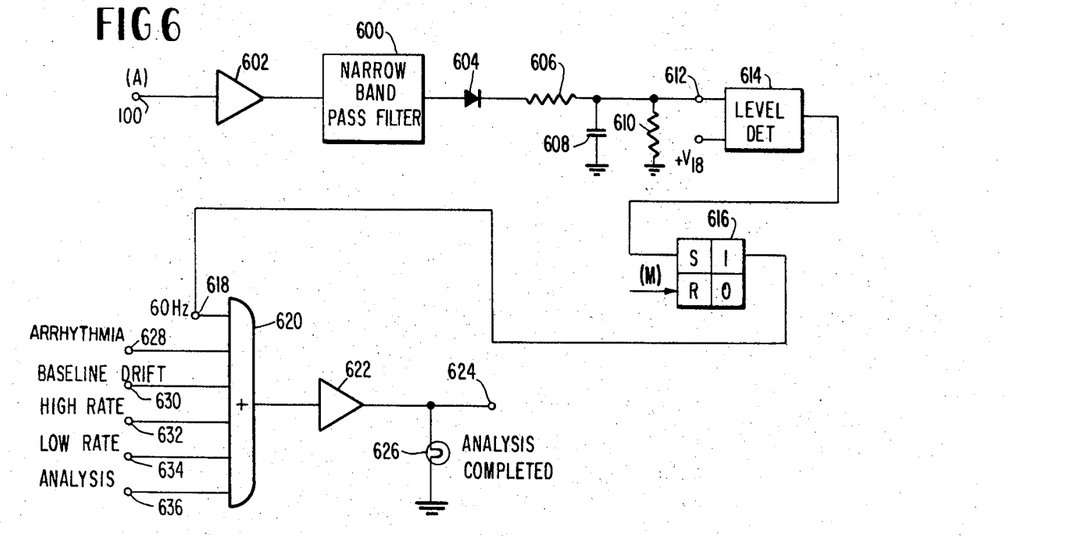
FIG. 6 is a schematic block diagram of an exemplary evaluation display inhibiting circuit.

Referring now to FIG. 6, the signal (A) may be applied from an input terminal 100 to a convention narrow band-pass filter 600 by way of a conventional amplifier 602. The filter 600 may, for example, be conveniently tuned to a frequency of 60 hertz plus or minus about 2 hertz. The output signal from the filter 600 may be rectified in a conventional half-wave or a full-wave rectifier indicated schematically at 604 and the DC signal which results therefrom applied to a filter network comprising a resistor 606 and a capacitor 608. A resistor 610 may be provided across the capacitor 608 to serve as a path for the discharge of the capacitor 608.

The charge on the capacitor 608 is applied to the uppermost input terminal 612 of a level detector 614 to which a positive reference voltage $+V_{1R}$ is also applied. The output signal from the level detector 614 is applied directly to the set input terminal S of a binary element or flip-flop 616 whose binary 1 output terminal is connected to a terminal 618 of a six input OR gate 620.

The output terminal of the OR gate 620 is inverted in an inverter 622 and may be used to disable the indicators of the analysis networks of FIGS. 3 and 4 by way of the output terminal 624. The output signal from the inverter 622 may also be applied across a suitable indicator lamp 626. The signal (M) may conveniently be applied to the reset input terminal R of the flip-flop 616 to remove the analysis display inhibiting signal.

In operation, the 60$H_z$ components in the signal (A) are passed through the filter 600 and are rectified to effect the charging of the capacitor 608. The value of the resistor 610 may be conveniently chosen significantly larger than the value of the resistor 606, e.g., on the order of four or five times larger. The rectified 60 $H_z$ components of the signal (A) will thus be insufficient to exceed the level of the reference voltage $+V_{1R}$ due to the drainage of the charge on the capacitor 608 through the resistor 610.

Should a stray 60 $H_z$ signal be picked up, the level of the reference voltage $+V_{1R}$ will be exceeded by the charge on the capacitor 608 and the flip-flop 616 will be set. The resulting high signal level on the binary 1 output terminal of the flip-flop 616 will be passed through the OR gate 620 to remove the high signal level on the terminal 624. The loss of the signal on the terminal 624 may also be used to disable the indicators of the analysis circuits of FIGS. 3 and 4. A simple AND gate (Not shown) in the input of the analysis indicators may be employed for this purpose. Alternatively, the "analysis completed" terminal 624 may be used as the power supply for the analysis indicators described supra.

The indicators of the analysis networks of FIGS. 3 and 4 may also be disabled for a number of other reasons. For this purpose, a signal indicating excessive arrhythmia may be applied to the input terminal 628. Similarly, a signal indicative of excessive base line drift may be applied to the input terminal 630 to prevent erroneous evaluation of the amplitude of the detected waves. An excessively high heart rate and an excessively low heart rate may also result in erroneous indications, and signals so indicating may be applied respectively to the input terminals 632 and 634.

Since many of the waves are evaluated prior to identification, the input terminal 636 may be provided with a high signal level which is removed only after the analysis circuits have had an opportunity to complete the evaluation of the wave and to reset the analysis circuits if the subsequent identification of the wave so dictates. The energization of the lamp 626 may thus be used indicating that an analysis has in fact been completed. The signal (L) may, for example, be used for this purpose.

The present invention may be embodied in other specific forms without departing from the spirit of the invention or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claimer are therefore intended to be embraced therein.

I claim:

1. The method of identifying an R wave comprising the steps of:
   a. detecting an ECG signal including a positive wave to be identified;
   b. generating a first signal coincident with the major inflection point of the ECG signal; and
   c. generating a distinctive signal when the positive wave to be identified precedes the first signal and when the detected ECG signal becomes negative within about 10 to 30 milliseconds after the termination of the positive wave whereby the positive wave is identified as an R wave.

2. The method of identifying an R wave comprising the steps of:
   a. detecting an ECG signal including a positive wave to be identified;
   b. generating a first signal coincident with the major inflection point of the ECG signal; and
   c. generating a second signal coincident with the termination of the detected positive wave; and
   d. generating a distinctive signal when the generation of said second signal is preceded within about 80 milliseconds by the generation of said first signal whereby the positive wave is identified as an R wave.

3. The method of claim 1 including the evaluation of the width of the identified R wave by the further steps of:
   generating a second signal when the amplitude of the positive wave exceeds a predetermined limit;
   terminating the second signal when the amplitude of the positive wave thereafter falls below a predetermined limit; and
   measuring the duration of the second signal responsively to the generation of the distinctive signal whereby the width of the R wave is evaluated.

4. The method of claim 1 including the evaluation of the amplitude of the identified R wave by the further steps of:
   generating a second signal when the amplitude of the positive wave exceeds a predetermined limit;
   generating a third signal when the amplitude of the positive wave exceeds a second predetermined limit; and
   indicating the evaluation of the R wave amplitude in response the generation of the second, third, and distinctive signal.

5. The method of identifying a positive wave of an ECG signal as a positive P wave comprising the steps of:
   a. detecting an ECG signal including a positive wave to be identified;
   b. generating a first signal coincident with the major inflection point of the detected ECG signal; and
   c. generating a distinctive signal when the positive wave to be identified terminates before the generation of the first signal and the detected ECG signal does not go negative within about 10 to 30 milliseconds of the termination of the positive wave to be identified whereby the positive wave of the ECG signal is identified as a positive P wave.

6. The method of identifying a negative wave of an ECG signal as a negative P wave comprising the steps of:
   a. detecting an ECG signal including a negative wave to be identified; and
   b. generating a first signal coincident with the major inflection point of the detected ECG signal; and
   c. generating a distinctive signal when the first signal is generated more than about 55 milliseconds after the termination of the negative wave whereby the negative wave of the ECG signal is identified as a negative P wave.

7. The method of claim 5 including the evaluation of the amplitude of the identified P wave by the further steps of:
   generating a second signal when the amplitude of the positive wave exceeds a predetermined value; and
   indicating the generation of the second signal responsively to the generation of the distinctive signal.

8. The method of claim 5 including the evaluation of the width of the identified P wave by the further steps of:
   a. generating a second signal when the amplitude of the positive wave exceeds a predetermined value;
   b. terminating the second signal when the amplitude of the positive wave thereafter falls below a predetermined value; and
   c. measuring the duration of the second signal responsively to the generation of the distinctive signal.

9. The method of claim 5 including the evaluation of the P—R interval by the further steps of:
   generating a second signal when the wave to be identified exceeds predetermined limits;
   generating a third signal when the detected ECG signal next exceeds predetermined limits;
   generating a fourth signal when the time interval between the generation of the second and third signals exceeds predetermined limits; and
   indicating the generation of the fourth signal in response to the generation of the distinctive signal whereby the P—R interval is evaluated.

10. The method of identifying a negative wave of an ECG signal as an S wave comprising the steps of:
    a. detecting an ECG signal including a negative wave to be identified;
    b. generating a first signal coincident with the major inflection point of the ECG signal;
    c. generating a second signal when the first signal precedes the termination of the negative wave whereby the negative wave is identified as an S wave.

11. The method of claim 10 including the evaluation of the amplitude of the identified S wave by the further steps of:
    a. generating a third signal when the amplitude of the negative wave exceeds a first predetermined value;
    b. generating a fourth signal when the amplitude of the negative wave exceeds a second predetermined value; and
    c. generating a distinctive signal responsively to said third and fourth signals whereby the amplitude of the S wave is evaluated.

12. The method of claim 10 including the evaluation of the width of the identified S wave by the further steps of:
    a. generating a third signal where the amplitude of the negative wave exceeds a predetermined value;
    b. terminating the third signal when the amplitude of the negative wave thereafter rises above a predetermined value;
    c. measuring the duration of the third signal responsively to the generation of the distinctive signal.

13. The method of identifying a negative wave of an ECG signal as a Q wave comprising the steps of:

a. detecting an ECG signal including a negative wave to be identified;
b. generating a first signal coincident with the major inflection point of the ECG signal;
c. generating a second signal upon termination of the negative wave; and
d. generating a distinctive signal if the second signal is generated within about 55 milliseconds after the termination of the negative wave whereby the negative wave is identified as a Q wave.

14. The method of claim 13 including the evaluation of the width of the identified Q wave by the further steps of:
a. generating a third signal where the amplitude of the negative wave exceeds a predetermined value;
b. terminating the third signal when the amplitude of the negative wave thereafter rises above a predetermined value;
c. measuring the duration of the third signal responsively to the generation of the distinctive signal.

15. The method of claim 13 including the evaluation of the amplitude of the identified Q wave by the further steps of:
a. generating a third signal when the amplitude of the negative wave exceeds a predetermined value; and
b. indicating the generation of the third signal responsively to the distinctive signal.

16. The method of evaluating a phase position of a variably recurrent waveform comprising the steps of:
a. detecting a phase position of a variably recurrent waveform;
b. evaluating the detected phase position as a plurality of phase positions of the waveform;
c. identifying a reference phase position of the detected waveform;
d. identifying the detected phase position with respect to the reference phase position; and
e. thereafter displaying the evaluation of the detected phase position corresponding to the phase position identified.

17. The method of claim 16 wherein the reference phase position is identified in part by a determination of the major inflection point of the waveform.

18. Apparatus for evaluating a wave of a variably recurrent waveform comprising:
input means for receiving the variably recurrent waveform including the wave to be evaluated;
means for establishing a reference position of said waveform;
means for evaluating said received wave as a plurality of different waves of said waveform; and
means coupled to said evaluating means and to said reference position establishing means for displaying the evaluation of said received wave as one of said plurality of different waves of said waveform.

19. The apparatus of claim 18 wherein said reference position establishing means includes means for detecting a characteristically recurring point of inflection of said waveform.

20. The apparatus of claim 18 wherein said reference position establishing means includes:
an analog differentiator coupled to said input means for differentiating said waveform;
amplitude responsive means coupled to said differentiator for detecting the major inflection point of said waveform and for generating a distinctive signal in a predetermined relationship thereto.

21. The apparatus of claim 18 wherein said received wave evaluating means includes:
a first level detector coupled to said input means for generating a first signal when the amplitude of said wave exceeds a first predetermined reference;
a second level detector coupled to said input means for generating a second signal when the amplitude of said wave exceeds a second predetermined reference;
means responsive to said first and second signals for indicating when the amplitude of said waveform is greater than said first reference and less than said second reference.

22. The apparatus of claim 18 wherein said evaluating means includes;
first level detector coupled to said input means for generating a first signal when the amplitude of said wave exceeds a predetermined reference;
a second level detector coupled to said input means for generating a second signal when the amplitude of said wave exceeds a second predetermined reference;
means for determining the duration of said first and second signals;
said display means being responsive to said duration determining means.

23. Apparatus for identifying a positive wave of an ECG signal comprising:
means for detecting an ECG signal including a positive wave to be identified;
means for generating a first signal in a predetermined relation to the major inflection point of said detected ECG signal;
means for generating a second signal in a predetermined relation to the termination of the positive wave to be identified; and
means for generating a third signal responsive to the generation of said first signal prior to the generation of said second signal, said third signal-generating means also being responsive to the generation of said second signal prior to the generation of said second signal when said ECG signal becomes negative within about 10 to 30 milliseconds after the generation of said second signal whereby said positive wave is identified as an R wave.

24. The apparatus of claim 23 including means for generating a fourth signal when said second signal is generated prior to the generation of said first signal in the absence of said third signal whereby said positive wave is identified as a positive P wave.

25. The apparatus for identifying a negative wave of an ECG signal comprising:
means for detecting an ECG signal including a negative wave to be identified;
means for generating a first signal in a predetermined relation to the major inflection point of the ECG signal;
means for generating a second signal in a predetermined relation to the termination of said negative wave; and
means for generating a third signal in response to the generation of said second signal prior to the generation of said first signal whereby the negative wave is identified as an S wave.

26. The apparatus of claim 25 including means for generating a fourth signal when the generation of said second signal precedes the generation of said first signal by more than about 55 milliseconds whereby the negative wave is identified as an inverted P wave.

27. The method of claim 2 including the evaluation of the width of the identified R wave by the further steps of:
generating a third signal when the amplitude of the positive wave exceeds a predetermined limit;
terminating the third signal when the amplitude of the positive wave thereafter falls below a predetermined limit; and
measuring the duration of the third signal responsively to the generation of the distinctive signal whereby the width of the R wave is evaluated.

28. The method of claim 2 including the evaluation of the amplitude of the identified R wave by the further steps of:
generating a second signal when the amplitude of the positive wave exceeds a predetermined limit;
generating a third signal when the amplitude of the positive wave exceeds a second predetermined limit; and
indicating the evaluation of the R wave amplitude in response the generation of the second, third, and distinctive signal.

29. The method of claim 6 including the evaluation of the amplitude of the identified P wave by the further steps of:
generating a second signal when the amplitude of the positive wave exceeds a predetermined value; and indicating the generation of the second signal responsively to the generation of the distinctive signal.

30. The method of claim 6 including the evaluation of the width of the identified P wave by the further steps of:
   a. generating a second signal when the amplitude of the positive wave exceeds a predetermined value;
   b. terminating the second signal when the amplitude of the positive wave thereafter falls below a predetermined value; and
   c. measuring the duration of the second signal responsively to the generation of the distinctive signal.

31. The method of claim 6 including the evaluation of the P—R interval by the further steps of:
   generating a second signal when the wave to be identified exceeds predetermined limits;
   generating a third signal when the detected ECG signal next exceeds predetermined limits;
   generating a fourth signal when the time interval between the generation of the second and third signals exceeds predetermined limits; and
   indicating the generation of the fourth signal in response to the generation of the distinctive signal whereby the P—R interval is evaluated.

32. The apparatus of claim 20 wherein said received wave-evaluating means includes:
   a first level detector coupled to said input means for generating a first signal when the amplitude of said wave exceeds a first predetermined reference;
   a second level detector coupled to said input means for generating a second signal when the amplitude of said wave exceeds a second predetermined reference;
   means responsive to said first and second signals for indicating when the amplitude of said waveform is greater than said first reference and less than said second reference.

33. The method of identifying a positive wave of an ECG signal as an R wave comprising the steps of:
   a. detecting a positive wave in an ECG signal;
   b. detecting the occurrence of the major inflection point of the ECG signal; and
   c. generating a distinctive signal when the major inflection point occurs during the detected positive wave whereby the positive wave is identified as an R wave.

34. The method of identifying a negative wave of an ECG signal as an S wave comprising the steps of:
   a. detecting a negative wave in an ECG signal;
   b. detecting the occurrence of the major inflection point of the ECG signal; and
   c. generating a distinctive signal when the major inflection point occurs during the detected negative wave whereby the negative wave is identified as an S wave.

UNITED STATES PATENT OFFICE
CERTIFICATE OF CORRECTION

Patent No. 3,577,983  Dated May 11, 1971

Inventor(s) Lee R. Baessler

It is certified that error appears in the above-identified patent and that said Letters Patent are hereby corrected as shown below:

Col. 4, line 53, change "flip-flop 156" to --flip-flops 156--;
Col. 5, line 57, after "binary element" change "of" to --or--;
Col. 7, line 63, delete "0" before binary; and insert -- their --.
Col. 9, line 25, change "(b" to --(b)--;
Col. 9, line 65, change "$\overline{R}$" to --R-- and change "(R)" to --($\overline{R}$);
Col. 11, line 36, change "$\overline{R}$" to --R--;
Col. 11, line 37, change "(R)" to --($\overline{R}$);
Col. 15, line 1, change "$\overline{P}$" to --P--;
Col. 15, line 2, change "(P)" to --($\overline{P}$)--;

Col. 20, line 3, before "first level" insert --a--.

Signed and sealed this 4th day of January 1972.

(SEAL)
Attest:

EDWARD M. FLETCHER, JR.
Attesting Officer

ROBERT GOTTSCHALK
Acting Commissioner of Patents